Patented July 15, 1952

2,603,620

UNITED STATES PATENT OFFICE 2,603,620

PRODUCTION OF SOLUTIONS OF ACRYLONITRILE COPOLYMERS AND TEXTILES MADE THEREFROM

Andrew T. Walter, South Charleston, and George H. Fremon, Charleston, W. Va., assignors to Union Carbide and Carbon Corporation, a corporation of New York No Drawing. Application May 18, 1950, Serial No. 162,818

11 Claims. (Cl. 260—32.4)

This invention relates to new compositions comprising solutions of copolymers of acrylonitrile and vinyl chloride containing at least 30% of acrylonitrile in the polymer, and to a novel process for their production involving the use of a volatile solvent boiling well below 100° C. The invention also concerns the production from such solutions of valuable stretched filaments, fibers, yarns, monofils and other textile articles as well as films, sheets, and the like. The solutions can be used at elevated temperatures as coating, impregnating, sizing and adhesive compositions.

One of the principal objects of the invention is to provide solutions of resinous copolymers of acrylonitrile and vinyl chloride high in acrylonitrile content which are clear and homogeneous at temperatures below 100° C. and from which the solvent can be removed under commercially practicable conditions without objectionable discoloration or other injury to the resin article. Another object is to provide a solution of such a resin in a volatile solvent capable of being removed in principal part from filaments, yarns and other shaped articles made from solutions of the resin in such solvent under conditions preserving the important physical and chemical properties of the resin article. Another object is the production from such solutions of the aforesaid resins of stretched filaments, fibers, yarns, filaments and the like that are substantially free from solvents for said resin boiling above 100° C. and which are dimensionally stable at temperatures up to at least 150° C. Other objects of the invention will be apparent as the following description proceeds.

It is known that certain copolymers of acrylonitrile and vinyl chloride containing between 20% and 55% of acrylonitrile form clear, homogeneous dispersions in acetone, and that stretched filaments and films produced from such dispersions can be rendered dimensionally stable at temperatures around 100° C. and even thereabove by subsequent heat-treatment. Many important textile applications require that the stretched fibers be dimensionally stable at temperatures as high as 150° C. to 200° C., however, and the acrylonitrile-vinyl chloride copolymer fibers of the prior art cannot be used for such applications.

Fibers made of polyacrylonitrile resins generally are recognized as having high strain-release temperatures. We have found that in the case of the acrylonitrile-vinyl chloride copolymer resins the strain-release temperature of molecularly oriented fibers, filaments and yarns made therefrom increases with the acrylonitrile content of the resin. We also have found that, when dimensional stability at temperatures around 150° C. or higher is a principal requirement of a fiber or yarn made from acrylonitrile-vinyl chloride copolymers, those copolymers containing at least 60% of the acrylonitrile in the polymer are essential.

However, such acrylonitrile-vinyl chloride copolymers have very high melt-viscosities and tend to discolor and decompose at high temperatures; and attempts to melt-extrude these resins in the form of fine filaments or thin films have not been successful. The feasibility of fashioning such copolymers into fibers and films is therefore dependent upon their solubility in a practical sense in a commercially available, low boiling solvent. The solubility in acetone of acrylonitrile-vinyl chloride copolymers containing up to 55% of acrylonitrile renders them suitable for conversion into fibers and films. Prior to this invention, no equally satisfactory volatile solvent had been found for acrylonitrile-vinyl chloride copolymers of higher acrylonitrile content. Solvents thus far proposed for such copolymers and even for polyacrylonitriles have high boilingpoints, are difficultly removable from the spun filaments, and are difficult to recover in usable form. Efforts to free the spun filaments of such high-boiling solvents by heating cause objectionable darkening of the filaments, while efforts to leach such solvents from the filaments introduce serious solvent-recovery problems.

The present invention is based in important part upon the discovery that acetonitrile, although not a solvent at room temperature for certain acrylonitrile-vinyl chloride copolymers intermediate in composition between polyacrylonitrile and the acetone-soluble copolymers of the prior art, is an excellent solvent for such resins at temperatures around 60° C. and above, and that, by forming filaments, fibers and the like from such hot solutions and maintaining such shaped articles at temperatures sufficiently high to prevent precipitation of the resin from the solution until approximately all of the acetonitrile has been removed therefrom, the articles can be converted by known stretching and annealing procedures into strong, tough fibers, yarns and the like having high softening points and strain-release temperatures, and capable of withstanding substantially higher service temperatures than similar articles made from acetone-soluble acrylonitrile-vinyl chloride copolymers. Acetonitrile offers important advantages over high boiling solvents since the former boils at 82° C., is completely miscible with water and the lower aliphatic alcohols, is non-toxic and non-hazardous to personnel under the conditions of use in fiber and film manufacture, and is readily recoverable in pure form from such operations.

While certain acrylonitrile-vinyl chloride resinous copolymers having between around 30% and around 75% of acrylonitrile in the polymer and having specific viscosities within the range from 0.15 to 0.7 are soluble in acetonitrile at elevated temperatures around 60° C. and are useful with the invention, those copolymers having especial utility for the production of commercially useful spun filaments and yarns have average molecular weights corresponding to specific viscosities of between 0.15 and 0.7, and have acrylonitrile contents substantially wholly within the range between about 60% and about 75%, the latter varying inversely with the specific viscosity of the copolymer, as hereinafter indicated. Those resins having acrylonitrile contents within the range between about 60% and about 71% and specific viscosities of between 0.25 and 0.35 are preferred. The specific viscosities referred to herein are determined at 20° C., using an Ostwald viscosimeter, in accordance with the formula $$\text{Specific Viscosity} = \frac{\text{Viscosity of a solution of 0.1 gram of resin in 50 cc. of dimethyl formamide}}{\text{Viscosity of dimethyl formamide}} - 1$$

The specific viscosity of the resin is a direct function of its average molecular weight. The acrylonitrile content of an acetonitrile-soluble copolymer can be higher, the lower its specific viscosity. Thus, acrylonitrile-vinyl chloride copolymer resins having acrylonitrile contents above 70% should have specific viscosities no higher than about 0.3 in order to be acetonitrile soluble at 60° C., whereas those resins having acrylonitrile contents of 65% to 70% can have specific viscosities up to 0.6, and those having acrylonitrile contents of 30% to 65% can have specific viscosities even above 0.7.

The acrylonitrile-vinyl chloride copolymers useful with this invention are readily made by any of the usual polymerization processes employing peroxy-type catalysts. It is preferred to carry out the polymerization in aqueous emulsion. In making these emulsions, it is customary to use emulsifying and wetting agents such as the esters of sulfonated dicarboxylic acids and the water-soluble salts of alkylated derivatives of naphthalene sulfonic acids. The polymerization can be conducted at room temperature, but temperatures around 35° C. to 55° C. are preferred. The polymerization is accelerated by the use of the usual polymerization catalysts, e. g., the alkali metal persulfates such as potassium persulfate, and the organic peroxides such as benzoyl peroxide. If desired, 0.2% to 1% or more of a higher tertiary aliphatic mercaptan, such as tertiary dodecyl mercaptan, may be present to assist in regulating the molecular weight of the resin under the reaction conditions selected. When mercaptans are used, small additions thereof also may be made, if desired, during the polymerization.

A constant ratio of the monomers preferably is maintained in the reaction mixture throughout the polymerization by suitable additions thereto of acrylonitrile as required.

For the production of resinous acrylonitrile-vinyl chloride copolymers having acrylonitrile contents within the range between 60% and 71%, the weight ratio of monomeric acrylonitrile to monomeric vinyl chloride in the mixture undergoing polymerization is maintained within the range between about 1:3.7 and about 1:1.7, while for the production of those copolymers containing around 75% of acrylonitrile an acrylonitrile-vinyl chloride monomer ratio of around 1:1.3 is required. The average molecular weights of these resins, as measured by their specific viscosities, are controlled by adjusting the conditions of the polymerization in well-known manner.

Since acetonitrile is not a solvent at room temperature for the acetone-insoluble acrylonitrile-vinyl chloride copolymers herein described, such a powdered resin dispersed in acetonitrile at room temperature generally shows no evidence of incipient solvation even upon prolonged standing or agitation. This fact facilitates the production of uniform homogeneous solutions of the resins in acetonitrile without resorting to special techniques required with solvents that are highly active solvents for the resin at room temperature. (See G. H. Fremon Patent No. 2,413,758.)

Dissolution of the resin preferably is effected by heating a mixture of the finely divided resin and acetonitrile in a pressure-tight container. Dissolution of the resin takes place at an elevated temperature which varies somewhat with the composition and average molecular weight of the resin. Solvation generally begins at about 50° C. in the case of resins containing about 60% of acrylonitrile and having specific viscosities in the neighborhood of 0.15 to 0.20, and at about 75° C. in the case of resins containing around 70% of acrylonitrile and having specific viscosities around 0.20 to 0.25. In practice, solvation is accomplished in most instances at temperatures around 90° C. to 100° C. in pressure-resistant apparatus, the solvation step generally requiring an hour or less at such temperatures. However, temperatures of 125° C. or more can be used, if desired. After solvation is complete, solutions of the resins in acetonitrile are stable at around 60° C. or above, but tend to be thixotropic at temperatures around 50° C., while lower temperatures cause the resin to precipitate from solution. Reheating with agitation will render fluid a solution that has gelled as a result of cooling to too low a temperature. While the gelling tendency increases with an increase of concentration of resin in the solution, yarn has been successfully spun and films have been successfully cast from solutions in acetonitrile containing as much as 30% of the resin.

The acetonitrile solutions of this invention may have incorporated therein a small amount, e. g., about 0.25% or more of the weight of the resin, of a compound for stabilizing the resin against decomposition by heat or by light. Suitable compounds are the organo metallic tin and lead salts of carboxylic acids, such dibutyl tin maleate. Such stabilizers are disclosed in the United States Patents Nos. 2,267,778 and 2,307,092 of V. Yngve.

Filaments and yarns can be spun from these acetonitrile solutions at temperatures around 60° C.–80° C. by either the wet- or dry-spinning procedures, as illustrated herein. Excess solvent is removed from the shaped filaments by passing the latter through a current of air heated to 120° C.–200° C., or by immersing the filaments in water or an equivalent non-solvent for the resin which is a solvent for acetonitrile. The water can contain up to 30% of acetonitrile to control the rate of solvent removal from the filaments. Generally the yarns are stretched from 100% to 1,500% or more at temperatures around 140° C.–150° C. or higher to improve their physical properties.

Under comparable spinning conditions, those solutions of higher resin content yield filaments having more uniform cross-sections than those spun from solutions having lower resin contents, e. g., 15%–20% solutions. Filaments and fibers wet-spun from acetonitrile solutions of these resins into water as a coagulant tend to have irregular dog-bone cross-sections even when such solutions have resin concentrations as high as 28%–30%. Filaments that are generally round in cross-section and that have superior yarn qualities are produced when the extruded fibers are coagulated in water containing around 10 to 30 parts of acetonitrile per 100 parts of the mixture.

Acetonitrile solutions of the acetone-insoluble acrylonitrile-vinyl chloride copolymers herein described can be spun into filaments and yarns which, after being stretched and the stretched articles exposed for brief periods to temperatures within the range between 150° C. and 225° C. while under tension permitting controlled shrinkage of from 5% to 25% of the stretched length, can withstand service temperatures as high as 150° C. to 200° C. without appreciable shrinkage, and therefore are superior in this respect to similar articles made from acetone-soluble acrylonitrile-vinyl chloride copolymers of the prior art.

In spite of the high proportion of acrylonitrile in these copoymers, the films, filaments, fibers and multi-filament yarns made from acetonitrile solutions thereof will not support combustion. Moreover, the stretched filaments and yarns have good wet- and dry-tensile strengths and elongations; and good flexibility, elasticity, resilience, and resistance to water and various chemical agents including acids and dilute alkalies, and to bacterial and fungal growths. The stretched filaments and yarns have wet tenacities upwards of 6 grams per denier and wet elongations of from around 7.5% to 25% or more. The stretched and heat-treated filaments and yarns commonly have shrinkages of less than 5% in oil at 150° C.

The following examples serve to illustrate the invention, but are not intended to limit the scope thereof. In the examples, all parts are given in terms of weight unless otherwise indicated.

Example 1

To a stainless steel autoclave having an agitator were introduced 400 parts of water, 1.5 parts of sodium dioctyl sulfosuccinate and 0.22 part of tertiary dodecyl mercaptan. A mixture of 73 parts of vinyl chloride and 27 parts of arcylonitrile then was charged to the autoclave, and the temperature was raised to 42° C. Potassium persulfate (0.15 part) dissolved in water then was added. The ratio of acrylonitrile to vinyl chloride monomer in the mixture was maintained approximately uniform by addition of acrylonitrile at frequent intervals of from 2 to 15 minutes as required. A total of 33 parts of acrylonitrile and 0.93 part of tertiary dodecyl mercaptan was added during the polymerization period of 13.5 hours, after which 49% of the monomers had been converted to copolymers. The resin was recovered by precipitation with an aqueous calcium chloride solution, washed twice with hot water, centrifuged, and dried at 65° C.–70° C. This resin contained 66.8% of acrylonitrile and had a specific viscosity at 20° C. of 0.25. It was insoluble in acetone, and was completely soluble in commercial acetonitrile at 50° C. and higher, in concentrations up to at least 30%.

A portion of the resin was dispersed in acetonitrile to form at 75° C. a spinning solution containing approximately 28% of the resin. The resultant solution at 75° C. was forced through a spinneret containing 20 orifices each 0.11 mm. in diameter. The resultant filaments were freed of excess solvent in a counter-current flow of air within a vertical spinning tube maintained at 180° C. The filaments were collected on bobbins, aged 16 hours at room temperature, and then stretched 1,005% at 140° C. Six ends then were twisted into a yarn having a wet tenacity of 4.8 grams per denier, a wet elongation of 8.2%, and a shrinkage in water at 100° C. of 10.1%. A portion of this stretched yarn was heated in package form for three hours in dry heat at 150° C. The resultant yarn had a wet tenacity of 4.5 grams per denier, a wet elongation of 14%, a zero shrinkage in water at 100° C., and a shrinkage in steam at 130° C. of less than 1.6%.

Another portion of the stretched yarn was rapidly annealed by conducting it continuously through a zone heated by dry heat to 190° C. while limiting the shrinkage of the yarn to 16.2% by take-off control, the time of exposure of the yarn to the heat being substantially 1.1 seconds. The resultant yarn had a wet tenacity of 3.9 grams per denier, a wet elongation of 15.7%, zero shrinkages in water at 100° C. and in oil at 150° C., respectively, and a shrinkage of but 6.9% in oil at 200° C.

Example 2

The following solution was charged to a glass-lined autoclave having a mechanical agitator:

| | Parts |
|---|---|
| Water | 900 |
| Sodium dioctyl sulfosuccinate | 2 |
| Tertiary dodecyl mercaptan | 0.2 |

A mixture of 70 parts of vinyl chloride and 30 parts of acrylonitrile was charged to the autoclave and the temperature raised to 45° C. One-half part of potassium persulfate dissolved in water then was added. The polymerization was conducted for 2.7 hours, at which time 27% of the monomer mixture had been converted to the copolymers. During this time the monomer ratio of acrylonitrile to vinyl chloride was maintained approximately uniform in the general manner described in Example 1. A total of 43 parts of acrylonitrile and 0.2 part of tertiary dodecyl mercaptan was added to the autoclave during the polymerization. The resin was recovered and dried in the manner described in Example 1. It contained 62.8% of acrylonitrile and had a specific viscosity of 0.31 in dimethyl formamide at 20° C. The resin was insoluble in acetone, but completely soluble in acetonitrile at 60° C. in at least 30% concentration.

A homogeneous clear spinning solution containing 28% of the resin in acetonitrile was made by heating a mixture of the resin and acetonitrile to about 70° C. This solution then was dry spun in the general manner described in Example 1, forming continuous filaments. The theoretical orifice velocity of the filaments at the spinneret outlet was 80 feet per minute, and the temperature of the drying air in the spinning cell was 120° C. The resultant filaments were collected, boiled in water 0.5 hour to remove residual acetonitrile, and then were stretched to 600% of their original length during a one-second exposure in steam at 140° C. The stretched yarn had a wet tenacity of 4.7 grams per denier, a wet elongation of 10.6%, and a shrinkage in boiling water of 13.4%.

A portion of the stretched yarn was heated for three hours in steam at 135° C. while untensioned, yielding a yarn having a wet tenacity of 3.3 grams per denier, a wet elongation of 22.5%, and a zero shrinkage in oil at 180° C.

Another portion of the stretched yarn was passed at high speed between metal blocks maintained at 180° C. by dry heat, while permitting the yarn to shrink 21% during the one-second exposure in this heated zone. The resultant yarn had a wet tenacity of 3.1 grams per denier, a wet elongation of 20.9%, a shrinkage in water at 100° C. of 0.8%, and a shrinkage in oil at 200° C. of 3.4%.

*Example 3*

A homogeneous clear, spinning solution was prepared by mixing at room temperature 72 parts of acetonitrile with 28 parts of a resinous copolymer of acrylonitrile and vinyl chloride containing 2% of dibutyl tin maleate, based upon the weight of the resin, said copolymer containing 67.5% of acrylonitrile and having a specific viscosity of 0.28 in dimethyl formamide at 20° C., and heating the mixture 2 hours at 100° C. in a nitrogen atmosphere to effect solution. After filtering the clear hot solution, it was forced through a spinnerette maintained at 75° C. and having 40 orifices each 0.11 mm. in diameter. The extruded filaments issued into a coagulating bath consisting of approximately 30 parts of acetonitrile and 70 parts of water maintained at 65° C., and were conducted therethrough at a rate permitting a 5-second contact with the said bath. The filaments then were collected on a bobbin to form yarn at the rate of 150 feet per minute, and were aged 96 hours in air at room temperature to remove residual solvent. The resultant yarn was stretched 850% in steam at 145° C. The stretched yarn had a wet tenacity of 5.15 grams per denier, a wet elongation of 8.1%, and a shrinkage of 10.3% in water at 100° C.

A portion of the stretched yarn was heated for 3 hours in dry heat at 155° C. while untensioned. The resultant yarn had a wet tenacity of 4.75 grams per denier, a wet elongation of 13.7%, a zero shrinkage in water at 100° C. and a shrinkage of 5% in oil at 200° C.

Another portion of the stretched yarn was continuously annealed by passing it through a heating zone maintained at 200° C. by dry heat, while permitting the yarn to shrink 10%, the time of exposure of the yarn to such heat being 0.7 second. The resultant yarn had a wet tenacity of 4.07 grams per denier, a wet elongation of 14%, and shrinkages in oil at 150° C. and at 200° C. of 2% and 6.8%, respectively.

*Example 4*

Employing a spinning solution identical with that disclosed in Example 3 but wherein the dibutyl tin maleate had been replaced with 2% of dibutyl tin di(ethylpropylacrylate) based upon the weight of copolymer, yarn was spun, stretched, and annealed untensioned at 155° C. under conditions identical with those recited in Example 3, excepting that the spun yarn was stretched 1,286% in dry heat at 145° C. The spun yarn had the following properties:

| | Stretched Yarn | |
|---|---|---|
| | Before Annealing | After heating 3 hrs. at 155° C. in dry heat while Untensioned |
| Tenacity, grams per denier, wet | 6.00 | 5.7 |
| Elongation, percent, wet | 7.4 | 14.4 |
| Shrinkage, percent, in water at 100° C | 10.3 | |
| Shrinkage, percent, in steam at 140° C | | 4.8 |
| Shrinkage, percent, in oil at 200° C | | 3.2 |

The filaments spun from the aforesaid acetonitrile solutions may be used, either in the stretched or unstretched condition, for the production of staple fibers or artificial wool-like masses. The filaments, or staple fibers made therefrom, are useful for making felted articles, threads, yarns, etc., either alone or in conjunction with various types of natural fibers such as cotton, wool and silk; or with other artificial textile fibers such as those made from cellulose acetate, viscose cellulose, nylon, and the vinyl resins such as polyvinyl chlorides, vinyl chloride-vinyl acetate copolymers, and acetone-soluble vinyl chloride-acrylonitrile copolymers.

The new filaments, and staple fibers and yarns made therefrom, are useful for making a wide variety of woven, knitted and braided articles such as industrial filter fabrics, protective pipe covering, electrical insulation, protective clothing, bathing suits, hosiery, and other textile articles. The yarns can be used in pile fabrics, either as the backing or the pile or both.

In general, the acetonitrile solutions of the resin are not limited to use for the production of textile articles, but can be used for the production at elevated temperatures of films, sheets, and adhesive, coating and impregnating compositions and the like.

We claim:

1. A homogeneous solution comprising a copolymer of acrylonitrile and vinyl chloride dissolved in acetonitrile, said copolymer containing between around 30% and around 75% of the acrylonitrile.

2. A homogeneous solution comprising a copolymer of acrylonitrile and vinyl chloride dissolved in acetonitrile, said copolymer containing between around 30% and around 75% of the acrylonitrile and having a specific viscosity within the range from 0.15 to 0.7.

3. A homogeneous spinnable solution comprising a copolymer of acrylonitrile and vinyl chloride dissolved in acetonitrile, said copolymer containing between around 60% and around 75% of the acrylonitrile and having a specific viscosity within the range from around 0.15 to around 0.6.

4. A homogeneous spinnable solution comprising a copolymer of acrylonitrile and vinyl chloride dissolved in acetonitrile, said copolymer containing between around 60% and around 71% of acrylonitrile and having a specific viscosity within the range from around 0.15 to around 0.6.

5. Process for preparing homogeneous spinnable solutions of acetone-insoluble copolymers of acrylonitrile and vinyl chloride containing between around 60% and around 75% of the acrylonitrile in the polymer, which comprises dispersing such a copolymer in acetonitrile, and thereafter heating the resultant dispersion to a temperature of at least 60° C. with agitation until dissolution of said copolymer is complete.

6. Process for preparing homogeneous spinnable solutions of acetone-insoluble copolymers of acrylonitrile and vinyl chloride containing between around 60% and around 75% of the acrylonitrile in the copolymer, which comprises dispersing such a copolymer in acetonitrile, and thereafter heating the dispersion to a temperature within the range between around 60° C. and around 125° C. with agitation until dissolution of said copolymer is complete.

7. A stretched textile article selected from the class consisting of filaments, fibers and yarns composed of a resinous acetone-insoluble copolymer of acrylonitrile and vinyl chloride containing between around 60% and around 75% of the acrylonitrile in the copolymer, said article being substantially free from solvents for said copolymer boiling above 100° C.

8. A stretched textile article selected from the class consisting of filaments, fibers and yarns composed of a resinous acetone-insoluble copolymer of acrylonitrile and vinyl chloride containing between around 60% and around 71% of the acrylonitrile in the copolymer and having a specific viscosity within the range from around 0.15 to around 0.6, said article being substantially free from solvents for said copolymer boiling above 100° C.

9. A stretched textile filament composed of a resinous acetone-insoluble copolymer of acrylonitrile and vinyl chloride containing between around 60% and around 75% of acrylonitrile in the copolymer and having a specific viscosity within the range from 0.15 to 0.6, said filament being approximately round in cross-section and being substantially free from solvents for said copolymer boiling above 100° C.

10. A stretched textile filament composed of a resinous acetone-insoluble copolymer of acrylonitrile and vinyl chloride containing between around 60% and around 75% of acrylonitrile in the copolymer and having a specific viscosity within the range from 0.15 to 0.6, said filament having an irregular dog-bone cross-section and being substantially free from solvents for said copolymer boiling above 100° C.

11. A stretched textile article selected from the class consisting of filaments, fibers and yarns composed of a resinous acetone-insoluble copolymer of acrylonitrile and vinyl chloride containing between around 60% and around 71% of the acrylonitrile in the copolymer and having a specific viscosity within the range from around 0.15 to around 0.6, said article being substantially free from solvents for said copolymer boiling above 100° C. and being dimensionally stable at temperatures up to at least 150° C.

ANDREW T. WALTER.
GEORGE H. FREMON.

REFERENCES CITED

The following references are of record in the file of this patent:

UNITED STATES PATENTS

| Number | Name | Date |
| --- | --- | --- |
| 2,404,724 | Houtz | July 23, 1946 |
| 2,496,267 | Chaney | Feb. 7, 1950 |
| 2,499,477 | Feild | Mar. 7, 1950 |